(12) United States Patent
Bauer et al.

(10) Patent No.: US 10,945,562 B2
(45) Date of Patent: Mar. 16, 2021

(54) BUN HOLDING CABINET

(71) Applicant: Prince Castle LLC, Carol Stream, IL (US)

(72) Inventors: Richard Bauer, Palatine, IL (US); Donald Sweeney, St. Charles, IL (US); Glenn Schackmuth, Oswego, IL (US); Scott Rote, Mokena, IL (US); Nathan Wicker, Chicago, IL (US); David Wylen, Chicago, IL (US); Peter Muller, Chicago, IL (US); Thomas Tyrawa, Streamwood, IL (US); Marcus Frio, St. Charles, IL (US); Steven Shei, Fort Wayne, IN (US); Quinton Ford, Chicago, IL (US); Tyler Greek, Plainfield, IL (US)

(73) Assignee: Prince Castle LLC, Carol Stream, IL (US)

( * ) Notice: Subject to any disclaimer, the term of this patent is extended or adjusted under 35 U.S.C. 154(b) by 0 days.

(21) Appl. No.: 16/240,008

(22) Filed: Jan. 4, 2019

(65) Prior Publication Data
US 2019/0208964 A1 Jul. 11, 2019

Related U.S. Application Data

(60) Provisional application No. 62/614,015, filed on Jan. 5, 2018.

(51) Int. Cl.
*G07F 11/58* (2006.01)
*A47J 47/12* (2006.01)
(Continued)

(52) U.S. Cl.
CPC .............. *A47J 47/12* (2013.01); *G07F 9/105* (2013.01); *G07F 11/58* (2013.01);
(Continued)

(58) Field of Classification Search
CPC .......... G07F 11/60; G07F 11/52; G07F 11/50; G07F 11/56; A47J 37/0857; A47J 37/0864; A47J 37/0871; B26D 3/30
(Continued)

(56) References Cited

U.S. PATENT DOCUMENTS 3,183,856 A 5/1965 Jolly
3,266,442 A 8/1966 Udall et al.
(Continued)

FOREIGN PATENT DOCUMENTS

CA   2923038 A1   12/2015
CN   105608794    5/2016
(Continued)

OTHER PUBLICATIONS

International Search Report and Written Opinion issued in corresponding PCT Application No. PCT/US2019/012316, dated Feb. 22, 2019.

*Primary Examiner* — Timothy R Waggoner
(74) *Attorney, Agent, or Firm* — Andrus Intellectual Property Law, LLP

(57) ABSTRACT

A baked good holding cabinet includes a compartment and provides a controlled environment within the compartment. A tray is configured to receive a plurality of baked goods and to be received within the compartment to hold the plurality of baked goods in the controlled environment. A cabinet actuator is operable to move a baked good within the cabinet to a dispense point of the cabinet.

15 Claims, 8 Drawing Sheets

(51) Int. Cl.
*G07F 9/10* (2006.01)
*G07F 17/00* (2006.01)
*A47F 1/12* (2006.01)
*A47J 37/08* (2006.01)

(52) U.S. Cl.
CPC .......... *G07F 17/0078* (2013.01); *A47F 1/125* (2013.01); *A47J 37/0864* (2013.01)

(58) Field of Classification Search
USPC ........................................................ 221/133
See application file for complete search history.

(56) References Cited

U.S. PATENT DOCUMENTS

| | | | |
|---|---|---|---|
| 3,343,715 A | 9/1967 | Edwards | |
| 3,915,316 A | 10/1975 | Pomara, Jr. | |
| 4,006,831 A | 2/1977 | Jimenez | |
| 4,034,661 A | 7/1977 | Boosalis et al. | |
| 4,054,015 A | 10/1977 | Rowell | |
| 4,261,257 A | 4/1981 | Henderson et al. | |
| 4,503,502 A | 3/1985 | Chapin | |
| 4,530,632 A | 7/1985 | Sela | |
| 4,547,851 A | 10/1985 | Kurland | |
| 4,553,222 A | 11/1985 | Kurland et al. | |
| 4,620,826 A | 11/1986 | Rubio et al. | |
| 4,677,888 A | 7/1987 | Terragnoli | |
| 4,760,777 A | 8/1988 | Welsh | |
| 4,797,818 A | 1/1989 | Cotter | |
| 4,919,950 A | 4/1990 | Mak | |
| 4,922,435 A | 5/1990 | Cahlander et al. | |
| 4,944,218 A | 7/1990 | Cresson | |
| 5,000,345 A | 3/1991 | Brogna et al. | |
| 5,113,754 A * | 5/1992 | Robinson | A47J 37/044 99/326 |
| 5,127,544 A | 7/1992 | Robinson et al. | |
| 5,132,914 A | 7/1992 | Cahlander et al. | |
| 5,172,328 A | 12/1992 | Cahlander et al. | |
| 5,253,762 A | 10/1993 | Duncan | |
| 5,509,573 A * | 4/1996 | Campoli | A61C 19/00 221/133 |
| 5,540,943 A | 7/1996 | Naramura | |
| 5,546,848 A | 8/1996 | Naramura | |
| 5,562,183 A | 10/1996 | Naramura | |
| 5,724,886 A | 3/1998 | Ewald et al. | |
| 5,755,149 A | 5/1998 | Blanc et al. | |
| 5,763,861 A | 6/1998 | Herrera et al. | |
| 6,042,864 A * | 3/2000 | Bastasch | A21C 15/04 426/497 |
| 6,236,974 B1 | 5/2001 | Kolawa et al. | |
| 6,298,331 B1 | 10/2001 | Walker et al. | |
| 6,367,653 B1 * | 4/2002 | Ruskin | G07F 9/026 221/1 |
| 6,473,739 B1 | 10/2002 | Showghi et al. | |
| 6,585,477 B1 | 7/2003 | Lawrence | |
| 6,647,864 B1 | 11/2003 | Fang | |
| 6,704,616 B2 | 3/2004 | Formon | |
| 6,751,525 B1 | 6/2004 | Crisp, III | |
| 6,808,082 B2 * | 10/2004 | Ohkubo | G07F 11/58 221/123 |
| 6,902,083 B1 * | 6/2005 | Michael | G07F 11/42 221/100 |
| 6,930,296 B2 | 8/2005 | Chen | |
| 7,092,988 B1 | 8/2006 | Bogatin et al. | |
| 7,110,964 B2 | 9/2006 | Tengler et al. | |
| 7,141,258 B2 | 11/2006 | Hillmann | |
| 7,183,518 B2 | 2/2007 | Near et al. | |
| 7,353,136 B2 | 4/2008 | Vock et al. | |
| 7,478,749 B2 | 1/2009 | Clothier et al. | |
| 7,493,362 B2 | 2/2009 | Bogatin et al. | |
| 7,584,868 B2 * | 9/2009 | Bauch | B65G 33/04 221/197 |
| 7,757,602 B2 | 7/2010 | Aubry et al. | |
| 7,885,852 B2 | 2/2011 | Banerjee et al. | |
| 8,307,951 B2 | 11/2012 | Sus et al. | |
| 8,448,567 B2 | 5/2013 | Martin et al. | |
| 8,458,311 B2 | 6/2013 | Jang et al. | |
| 8,498,896 B2 | 7/2013 | Banerjee et al. | |
| 9,049,875 B2 | 6/2015 | Ewald et al. | |
| 9,066,627 B2 | 6/2015 | Baranowski et al. | |
| 9,090,446 B2 | 7/2015 | Crisp, III | |
| 9,295,282 B2 | 3/2016 | Vardakostas et al. | |
| 9,326,544 B2 | 5/2016 | Vardakostas et al. | |
| 9,327,958 B2 | 5/2016 | Angus et al. | |
| 9,532,575 B1 | 1/2017 | Donisi et al. | |
| 9,585,401 B2 | 3/2017 | Wiker et al. | |
| 9,589,412 B2 * | 3/2017 | Shimmerlik | B60P 3/0257 |
| 9,652,756 B2 | 5/2017 | Knecht et al. | |
| 9,701,530 B2 | 7/2017 | Kline et al. | |
| 9,718,568 B2 | 8/2017 | Vardakostas et al. | |
| 9,770,049 B2 | 9/2017 | Vardakostas et al. | |
| 9,788,687 B2 | 10/2017 | Frehn et al. | |
| 9,805,351 B2 | 10/2017 | Harman | |
| 10,067,109 B2 | 9/2018 | Frehn et al. | |
| 10,068,273 B2 | 9/2018 | Frehn et al. | |
| 10,086,525 B2 | 10/2018 | Engel-Hall et al. | |
| 2002/0059859 A1 | 5/2002 | Verklan | |
| 2003/0078793 A1 | 4/2003 | Toth | |
| 2003/0205028 A1 * | 11/2003 | Sus | A47J 37/1228 53/440 |
| 2004/0083201 A1 | 4/2004 | Sholl et al. | |
| 2004/0107141 A1 | 6/2004 | Conkel et al. | |
| 2004/0143503 A1 | 7/2004 | Suthar | |
| 2004/0238555 A1 | 12/2004 | Parks | |
| 2005/0021173 A1 * | 1/2005 | Pinney | G06F 19/3462 700/231 |
| 2005/0049940 A1 | 3/2005 | Tengler et al. | |
| 2005/0182680 A1 | 8/2005 | Jones, III et al. | |
| 2007/0251521 A1 | 11/2007 | Schackmuth et al. | |
| 2008/0163762 A1 * | 7/2008 | Weiss | A21B 1/48 99/443 C |
| 2008/0319864 A1 | 12/2008 | Leet | |
| 2009/0070229 A1 | 3/2009 | Ansari et al. | |
| 2009/0152345 A1 | 6/2009 | Johnson | |
| 2010/0049578 A1 | 2/2010 | Salerno | |
| 2010/0274633 A1 | 10/2010 | Scrivano et al. | |
| 2012/0111698 A1 * | 5/2012 | Weiss | A21B 1/48 198/602 |
| 2012/0143730 A1 | 6/2012 | Ansari et al. | |
| 2014/0324607 A1 | 10/2014 | Frehn | |
| 2014/0330686 A1 | 11/2014 | Kulasooriya et al. | |
| 2015/0013550 A1 | 1/2015 | Lin | |
| 2015/0019354 A1 | 1/2015 | Chan et al. | |
| 2015/0187027 A1 | 7/2015 | Lowe | |
| 2015/0199667 A1 | 7/2015 | Fernando et al. | |
| 2016/0026958 A1 | 1/2016 | Lee | |
| 2016/0183728 A1 | 6/2016 | Moma et al. | |
| 2016/0235239 A1 | 8/2016 | Patadia | |
| 2016/0236367 A1 | 8/2016 | Engel-Hall et al. | |
| 2016/0244311 A1 | 8/2016 | Burks et al. | |
| 2016/0253084 A1 | 9/2016 | Deville et al. | |
| 2016/0330982 A1 | 11/2016 | Frehn et al. | |
| 2016/0338545 A1 | 11/2016 | Shah et al. | |
| 2016/0379293 A1 | 12/2016 | Barajas Gonzalez et al. | |
| 2017/0018041 A1 | 1/2017 | Fox | |
| 2017/0024789 A1 | 1/2017 | Frehn et al. | |
| 2017/0065117 A1 | 3/2017 | Reese et al. | |
| 2017/0116661 A1 | 4/2017 | Sundaram | |
| 2017/0208940 A1 | 7/2017 | Boudreault | |
| 2017/0215631 A1 | 8/2017 | Studor et al. | |
| 2017/0258271 A1 | 9/2017 | Guh | |
| 2017/0280763 A1 | 10/2017 | Nazarian et al. | |
| 2018/0186022 A1 | 7/2018 | Fox et al. | |

FOREIGN PATENT DOCUMENTS

| | | |
|---|---|---|
| DE | 102005012536 | 9/2006 |
| DE | 102015113398 | 2/2017 |
| EP | 296496 | 12/1988 |
| EP | 777201 | 6/1997 |
| EP | 1337170 | 3/2007 |
| WO | 199109558 | 7/1991 |
| WO | 2009120262 | 10/2009 |

(56) References Cited

FOREIGN PATENT DOCUMENTS

| | | |
|---|---|---|
| WO | 2013184910 | 12/2013 |
| WO | 2016079610 | 5/2016 |
| WO | 2017136605 | 8/2017 |
| WO | 2017177041 | 10/2017 |

* cited by examiner

BUN HOLDING CABINET

CROSS-REFERENCE TO RELATED APPLICATIONS

The present application claims priority of U.S. Provisional Patent Application No. 62/614,015, filed on Jan. 5, 2018, the content of which is hereby incorporated by reference in its entirety.

BACKGROUND

The present disclosure is related to the field of food preparation. More specifically, the present disclosure is related to systems and methods of handling baked goods for use in the assembly of sandwiches in a food preparation setting.

Many restaurant and food service settings, particularly quick service restaurants (QSR) use a combination of pre-prepared and on-demand prepared food components in order to assemble foods ordered by customers, for example, hamburgers or sandwiches within a customer's time expectation. While one approach to order assembly would be to sequentially prepare each food item constituent on demand in the order in which it is needed, customer food preparation time expectations in the QSR setting are frequently not met with such an approach.

Additionally, as the number of menu options and accommodation of customer special requests or customizations proliferate, there is a need for management of a greater number and variety of food items and constituents. Management of prepared food constituent inventory is more challenging as the number of food constituents increases. Also, as order assembly becomes more complicated, the assembly instructions are harder for food preparation workers to remember and correctly follow. This creates a greater learning curve for new or inexperienced workers or for the introduction of new menu items.

Bread, rolls, or other baked goods commonly form the structure on or within which the substance of a sandwich or other food item is held. Sandwiches, including hamburgers, club sandwiches, open-faced sandwiches, and wrapped sandwiches are commonly prepared foods in restaurants and kitchens. In the QSR, fast casual restaurant, or institutional kitchen setting, handling (and toasting, if necessary) of the baked good can take nearly half of the total time required to prepare the ordered sandwich. As a further challenge, if left exposed, baked goods can quickly become stale, prone to mold, or otherwise degrade in flavor.

The increase in different baked good options further presents a challenge as a greater number of specialty baked goods which are less frequently used must be kept available. As baked goods can quickly begin to degrade when exposed to an uncontrolled environment, solutions that can handle multiple types of baked goods are needed.

There is a trend in restaurants and food service for increased menu options and for accommodation of further customer custom requests. This adds to the complexity of food item orders and foodservice workers are less able to rely on memorization of food item recipes to assemble the order. Increased menu options and custom accommodations further contribute to slow the assembly of these food items.

Thus further solutions are needed for the handling and preparation of baked goods in a restaurant or foodservice setting, particularly in the holding and direction of baked goods into subsequent processing.

BRIEF DISCLOSURE

An exemplary embodiment of a baked good holding cabinet includes a compartment defined by compartment walls. The compartment is configured to create a controlled environment within the compartment. A tray is configured to receive a plurality of baked goods and to be received within the compartment to hold the plurality of baked goods in the controlled environment. A cabinet actuator is operable to move a baked good within the cabinet to a dispense point of the cabinet.

In further embodiments of the baked good holding cabinet, the cabinet actuator engages the baked goods and moves the baked goods from the tray to the dispense point of the cabinet. The cabinet actuator may engage the tray and move the tray with the baked goods within the compartment. In embodiments of the baked good holding cabinet, each tray may define a plurality of lanes and each lane of the tray is configured to hold baked goods.

Embodiments of the baked good holding cabinet further include a conveyor operated to selectively advance a baked good from the tray to a dispensing point of the compartment. The tray may include the conveyor. Each tray may include a single conveyor and a plurality of dividing walls extend over the single conveyor to define lanes across the single conveyor. The baked good holding cabinet may further include a gate arranged relative to the dispense point. The gate may open through a compartment wall at the dispense point and is operable in coordination with at least one conveyor to selectively open to dispense the baked good out of the compartment. The plurality of trays may be movable by the cabinet actuator relative to the conveyor. In embodiments, the tray may include an aperture through which the conveyor can selectively extend to engage a baked good held in the tray above the aperture. Each tray of the plurality of trays may include a plurality of lanes and each lane of the tray includes an aperture. The baked good holding cabinet may include a plurality of conveyors and each conveyor extends through a respective aperture and selectively operates to advance a baked good from one of the lanes of a tray. The cabinet actuator may operate to move the plurality of trays relative to the plurality of conveyors to load a tray with buns for dispense. A position of the conveyor may be movable relative to the trays.

Embodiments of the baked good holding cabinet further include a processor. The processor may receive an instruction to dispense a baked good. The processor operates the cabinet actuator to move a baked good through the dispense point of the cabinet. An environmental control device is operable by the processor to maintain at least one predetermined environmental condition within the compartment. The predetermined environmental condition is at least one of temperature, humidity, and atmosphere composition. The processor may be communicatively connected to a kitchen management system (KMS) and receives instructions to dispense a baked good from the KMS. A plurality of different types of baked goods are held within the compartment and the instructions from the KMS identify a type of baked good to dispense from a plurality of baked goods held within the compartment and selectively operates a conveyor of a plurality of conveyors. Each tray may hold a type of baked good and the processor operates the cabinet actuator to advance a tray of the selected type of baked good to a position relative to the dispense point.

DETAILED DISCLOSURE

As provided herein exemplary embodiments of devices and systems for handling and dispensing baked goods in a restaurant or food service setting. The systems and devices as disclosed herein can be exemplarily used to handle a wide variety of baked goods, including but not limited to buns, rolls, English muffins, croissants, bagels, muffins, flatbread, pitas, cakes, pastries, and so forth.

Figure 1:
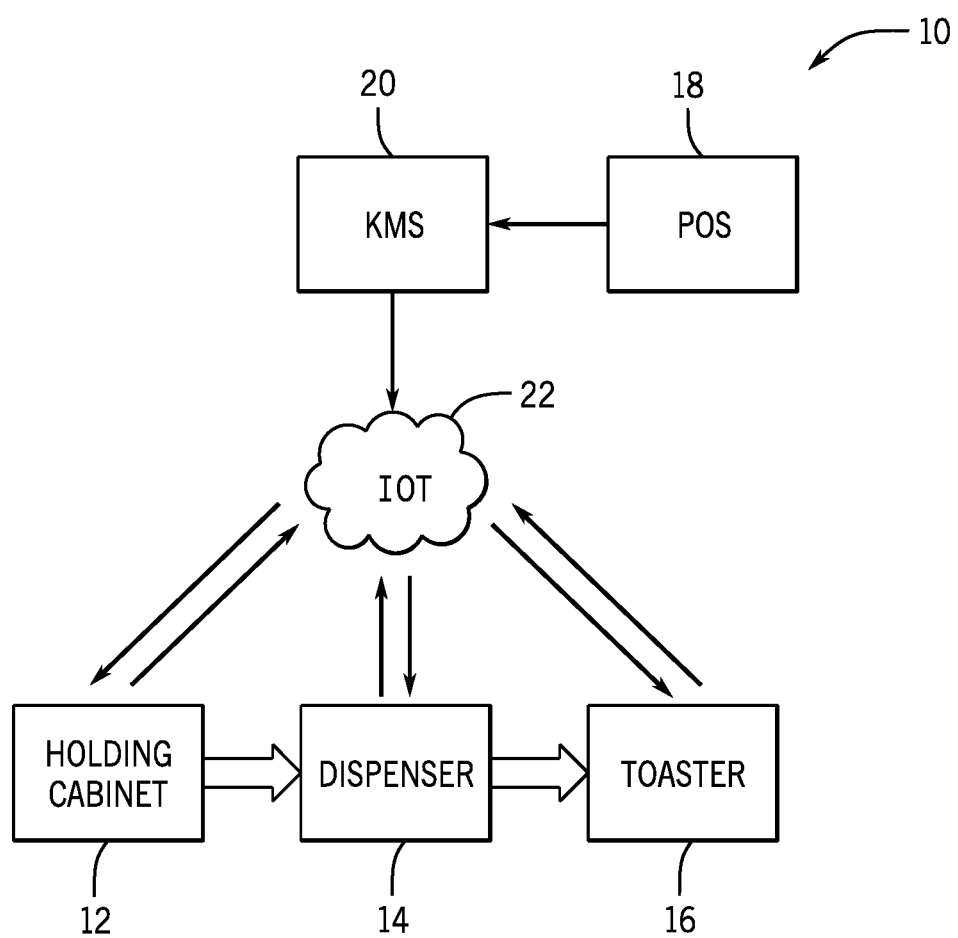
FIG. 1 is a system diagram of an exemplary embodiment of a baked goods handling system.

FIG. 1 is a system diagram of a baked good handling system 10 as will be described in further detail herein. The handling system 10 generally includes three components, a holding cabinet 12, a dispenser 14, and a treatment device, which may exemplarily be a toaster 16, as used in the present example. While these components will all be described in further detail herein, the holding cabinet 12 establishes and provides an environment conducive to extending the time that baked goods can be held without degradation in quality. The dispenser 14 selects an individual baked good from a plurality of baked goods which may all be the same or may include a variety of different types of baked goods for dispense. The dispenser 14 delivers the baked good to an output location and may further include separation of the baked good into halves. The output location of the dispenser 14 may be a treatment device, for example, a toaster 16. The toaster 16 is operated to provide a required amount of heat to the baked good to create a palatable Maillard reaction in the baked good. While the example treatment device of a toaster is generally used herein, embodiments may use other types of treatment devices as well. Treatment devices may include apparatus to perform a treatment on a dispensed baked good, such treatments including, but not limited to steaming, heating, topping, or packaging. Therefore, other treatment devices within the scope of the present disclosure may include a steamer, a condiment dispenser, or a packaging machine. Exemplary embodiments herein may describe the holding cabinet 12, dispenser 14, and toaster 16 as separate devices, however, it will be recognized from the present disclosure that in other embodiments, some or all of these components may be combined into an integrated device that performs two or more of the functions of these devices.

In an exemplary embodiment, a customer order is exemplarily received from a point of sale (POS) system 18, the customer order identifies one or more food products requiring assembly to complete the order. The customer order is exemplarily provided to a kitchen management system (KMS) 20 that identifies the components of each of the food products in the customer order and also exemplarily tracks, manages, and coordinates kitchen inventory and the order in which food products are processed, for example, with the baked good handling system 10. In doing so, the KMS 20 can provide control signals to each of the devices in the baked good handling system 10, and any other communication-enabled devices in the kitchen. The holding cabinet 12, the dispenser 14, and the toaster 16 are each communicatively connected to the KMS 20 to receive these instructions of the customer orders and the baked goods needed for the incoming orders. In embodiments, the KMS 20 may be directly connected to one or more of the holding cabinet 12, the dispenser 14, and the toaster 16. In other embodiments, an internet-of-things (IOT) communications system 22 may be intermediate to the POS system 18, the KMS 20 and the devices of the baked good handling system. The IOT communications system 22 may communicatively connect the KMS 20 to each of the holding cabinet 12, the dispenser 14, and the toaster 16, as well as to other communication enabled devices within the kitchen setting.

While the POS system 18 and the KMS 20 are depicted as separate systems, it will be recognized that the POS system 18 and the KMS 20 may be provided as a single integrated system. The POS system 18 and the KMS 20 may be provided locally to the rest of the baked good handling system 10, but may also be provided wholly or partially from a remote location, for example through a networked or cloud-computing enabled implementation. Food item orders are exemplarily received at the POS system 18. The interface to the POS system 18 may be a register computer operated by a cashier, a drive-through ordering system, or an online ordering system, or any other point of sale order entry arrangement as will be recognized by a person of ordinary skill in the art in view of the present disclosure. The POS system 18 takes in the customer order which specifies one or more food items which require preparation and/or assembly. In exemplary embodiments, one such food item may be a cheeseburger sandwich. The POS system 18 can provide this order information to the KMS 20 which operates to coordinate operation of the baked good handling system 10 as well as customer order completion and delivery and restaurant inventory, both in inventory storage as well as for example within the baked good handling system 10 as will be described in further detail herein.

The restaurant IOT system 22 is exemplarily a communication network that includes a locally or remotely located server system that manages communication between the KMS 20 and baked goods handling system 10, and other communication enabled devices in the kitchen. The restaurant IOT system 22 is exemplarily a cloud-computing enabled system whereby data collection and serving of data is handled by one or more processors and/or servers. In embodiments, the restaurant IOT system 22 may include one or more communication gateways that manage the distributed communication to the plurality of component devices and to any other communication enabled devices in the restaurant.

The restaurant IOT system 22 facilitates the communication between the KMS 20 and the baked goods handling system 10 to provide instructions/control messages/commands from the KMS 20 to the component devices, and the IOT system 22 receives information back from the baked goods handling system 10 and relays this information to the KMS 20, for example, information related to device operation, current and/or used inventory or other operational parameters, including an identification of the device.

In operation, the POS system 18 receives the customer order, for example of a cheeseburger sandwich, and provides the order to the KMS 20. The KMS 20 identifies that the ordered cheeseburger sandwich requires a sesame seed roll. This instruction is provided to the holding cabinet 12 and/or to the dispenser 14 through the IOT system 22. The KMS 20 may further identify that the sesame roll is to be toasted. This instruction is provided to the toaster 16. In embodiments, the holding cabinet 12 may operate to select from the plurality of baked goods held therein for dispense by the dispenser, while in other embodiments, the dispenser 14 may select the baked good from the holding cabinet 12 and dispense it. It will be recognized that in still further embodiments, the holding cabinet 12 and the dispenser 14 may be combined as a single unit.

The holding cabinet 12 operates to control the environment within which the baked goods are held. The control of the environment may include, but is not limited to, temperature, humidity, and chemical composition. Embodiments of the holding cabinet 12 may either hold the baked goods at a heated temperature or a cooled temperature in combination with a target humidity, which may also be based upon the selected temperature. Further, the holding cabinet 12 may modify or control the composition of the gases in the environment to lower the oxygen content of the environment, for example with additional Nitrogen or Carbon Dioxide, which may inhibit oxidation and bacterial growth. These controls and operations by the holding cabinet 12 may help to keep the baked goods to stay fresh longer before toasting.

The dispenser 14 conveys, either by gravity or active conveyance, the bun to the toaster 16. The dispenser 14 may further include a separator that operates to separate the bun into two or more portions (e.g. crown and heel, or crown, club, and heel) for toasting individual components of the bun. The toaster 16 is communicatively connected to the KMS 20 through the IOT communication system 22 and receives an instruction that the selected baked good (sesame seed roll) is to be toasted. The toaster 16 may use this information to adjust one or more settings of the toaster 16 to create desired conditions for toasting of the selected baked good. It will be recognized that in embodiments, automation of bun toasting may eliminate human error of being incorrectly loaded into the toaster or the toasting of the wrong type of bun for the customer order. Non-limiting embodiments of toasters, features of which may be used in exemplary embodiments of baked goods handling systems 10 are described in "Toaster with Removable and Adjustable Conveyors", U.S. Patent Application Publication No. 2010/0275689 and "Toaster with Adjustable Conveyor", U.S. Patent Application Publication No. 2018/0289209, which are hereby incorporated by reference herein in their entireties.

The holding cabinet 12, the dispenser 14, and the toaster 16 may communicate back to the KMS 20 through the IOT system 22 to report a status of that device and/or that an operation has been completed. In this manner, the KMS 20 can track the progress of the baked good through its handling by the system 10. Additionally, this can facilitate inventory tracking, for example within the KMS 20. The KMS 20 may track the available inventory and/or conditions within the holding cabinet 12. In further embodiments, communication between the holding cabinet 12 and the KMS can be used to track the age of baked goods within the holding cabinet 12. The location of particular baked goods within the holding cabinet 12 may further be tracked to facilitate the determination and tracking of the particular age of baked goods. In embodiments, the age of baked goods may be tracked in terms of minutes or hours since the baked goods were loaded into the holding cabinet 12. The KMS 20 and/or the holding cabinet 12 may provide an indication when one or more types of baked goods held therein must be replenished. This replenishment may be based upon exceeding determined holding time for baked goods within the holding cabinet or may be based upon depletion of the stock of a particular baked good through use by the system. Exemplary embodiments of baked goods handling systems are further described in co-pending "Baked Good Handling System" U.S. patent application Ser. No. 16/209,437 filed on Dec. 4, 2018, which is incorporated by reference herein in its entirety.

Figure 2:
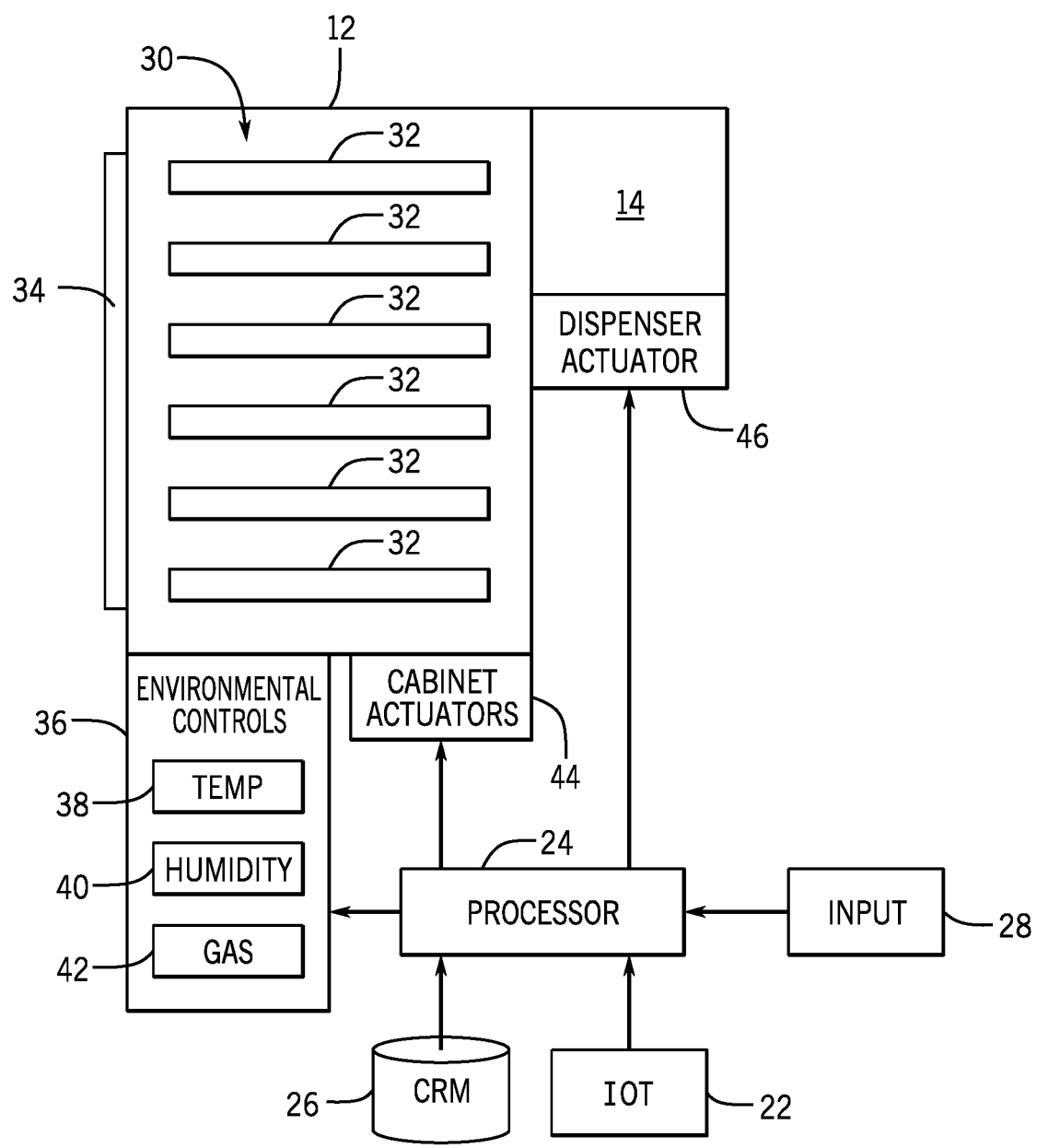
FIG. 2 is a system diagram of an exemplary embodiment of a holding cabinet.

FIG. 2 is a system diagram of an exemplary embodiment of a holding cabinet 12. As previously noted, the holding cabinet and the dispenser may be separate devices, but the embodiment presented in FIG. 2 depicts an embodiment that exemplarily combines the holding cabinet 12 and the dispenser 14 into a single system/device which may be contained within a single housing.

A processor 24 is communicatively connected to the IOT communication system 22, as described above with respect to FIG. 1. The processor 24 receives the instructions regarding a bun required to assemble an ordered sandwich. The processor 24 coordinates the operations and functions of the bun holding cabinet 12 and the dispenser 14 by providing control signals and instructions to various components of the system and collecting data and information from the operation of the system to report back to the KMS through the IOT communication system 22. As used herein, the term processor means any of a variety of known controllers, microcontrollers, integrated circuits, and/or printed circuit boards operable electronic to read and execute computer readable code to produce instructions and control commands as described in further detail herein. The processor 24 is further communicatively connected to a computer readable medium (CRM) 26, which is non-transient and stores computer readable code that is executable by the processor, and upon execution causes the processor to carry out the functions and operations as described in further detail herein.

The processor 24 is further connected to at least one input device 28 associated with the bun holding cabinet 12. The input device 28 may exemplarily include, but is not limited to, a keyboard and/or a touchscreen interface. The input device 28 is operable by a foodservice worker to perform a manual entry of a control or operation of the bun holding cabinet 12 rather than the instructions received by the processor 24 from the KMS 20 through the IOT communication system 22. In an embodiment, the foodservice worker may use the input device 28 to request a dispense of a particular bun for a special order sandwich to be prepared manually, or as a replacement for a bun damaged elsewhere during assembly of the sandwich. The foodservice worker may have the option to input or control any of the parameters and functions as described herein.

The bun holding cabinet 12 includes a compartment 30 that defines an enclosed area within which a plurality of trays 32 of buns are held. The trays 32 may be standardized trays in which the buns are baked or received by the restaurant. In such embodiments, the trays 32 may be loaded into the compartment 30 through a door 34 in the bun holding cabinet 12. In other embodiments, the trays may be of a different configuration and the buns are transferred into specifically designed trays 32 that are kept in the compartment 30 or are transferred into and out of the compartment 30. Further embodiments are described in additional examples provided herein, but embodiments of trays may include conveyors, pushers, or be configured to work in conjunction with such actuators to operate to dispense buns therefrom.

The processor 24 is communicatively connected to one or more environmental control devices 36. The environmental control devices 36 include a temperature control 38 which may include a heating element and/or a refrigeration element depending upon the conditions for optimal holding of the bun within the compartment 30. The environmental control devices 36 further include humidity control 40, which may include a humidifier and/or a dehumidifier to add or remove moisture from the compartment 30. The environmental control devices 36 further include gas concentration control 42 which may include supplies of gasses, for example, but not limited to, nitrogen or carbon dioxide that can be added to the compartment 30 to preserve bun freshness and inhibit spoilage before the buns are dispensed. While not depicted in FIG. 2, each of these environmental control devices 36 include associated sensors related to the environmental conditions to be controlled, these may include temperature sensors, humidity sensors, and gas composition sensors.

The processor 24 is communicatively connected to at least one cabinet actuator 44. The cabinet actuator 44 exemplarily operates to move the buns within the compartment to control the type and order in which buns are removed from the compartment 30. Exemplary embodiments of types of cabinet actuators 44 are described in further detail herein, although some embodiments may move the entire tray 32. Other embodiments may move individual buns within the compartment 30, while still other embodiments may do both. The cabinet actuators 44 may include mechanical elevators, lifts, or conveyors to position the trays 32 within the compartment 30. As previously noted the trays themselves 32 may include conveyors, pushers, or lifts, or be configured to operate with these cabinet actuators 44 within the compartment 30 to move individual buns out of the compartment 30. The bun holding cabinet 12 may include the conveyors, pushers, or lifts, as the cabinet actuators 44. These embodiments of cabinet actuators 44 may operate to selectively move buns off of the trays 32. In still further embodiments, the cabinet actuator 44 may include a door or gate, as described herein to control the dispense of buns out of the compartment 30.

In still further embodiments, the bun holding cabinet 12 may include one or more sensors positioned relative to an outlet of the compartment 30. In such embodiments, the cabinet actuators 44 may be operated to move a bun from one of the trays 32 into a queued position relative to the outlet of the compartment 30. When the bun is requested by the KMS, the bun in the queued position is dispensed. In another embodiment, sensors may be arranged within the compartment 30 so as to identify a location of a next bun to be dispensed from the cabinet. With the location of this bun identified, the bun holding cabinet 12 can operate to dispense that bun upon request. In still further embodiments, the cabinet actuators may operate to advance one or more buns towards the outlet of the compartment 30. One or more sensors detect when a bun leaves the outlet and advance of the buns within the compartment 30 is stopped.

The processor 24 is communicatively connected to at least one dispenser actuator 46 of the dispenser 14. As previously noted, the dispenser 14 in embodiments is integrated with the bun holding cabinet 12. The dispenser 14 may include a gate, which may be in the form of a door, to control the exit of a bun from the bun holding cabinet 12, the dispenser may include a conveyor or other powered manner of moving the bun from the bun holding cabinet 12 to the toaster (not depicted). The dispenser 14 may further include a bun separator and/or a bun diverter as examples of dispenser actuators 46. The bun separator, as described in further detail herein separates the portions of a pre-sliced bun (e.g. crown and heel, and optionally a club section), a diverter may direct a bun or a portion of a bun into a particular lane of a toaster. The lane of the toaster may be configured for particular toasting requirements specific to a bun portion.

Figure 3:
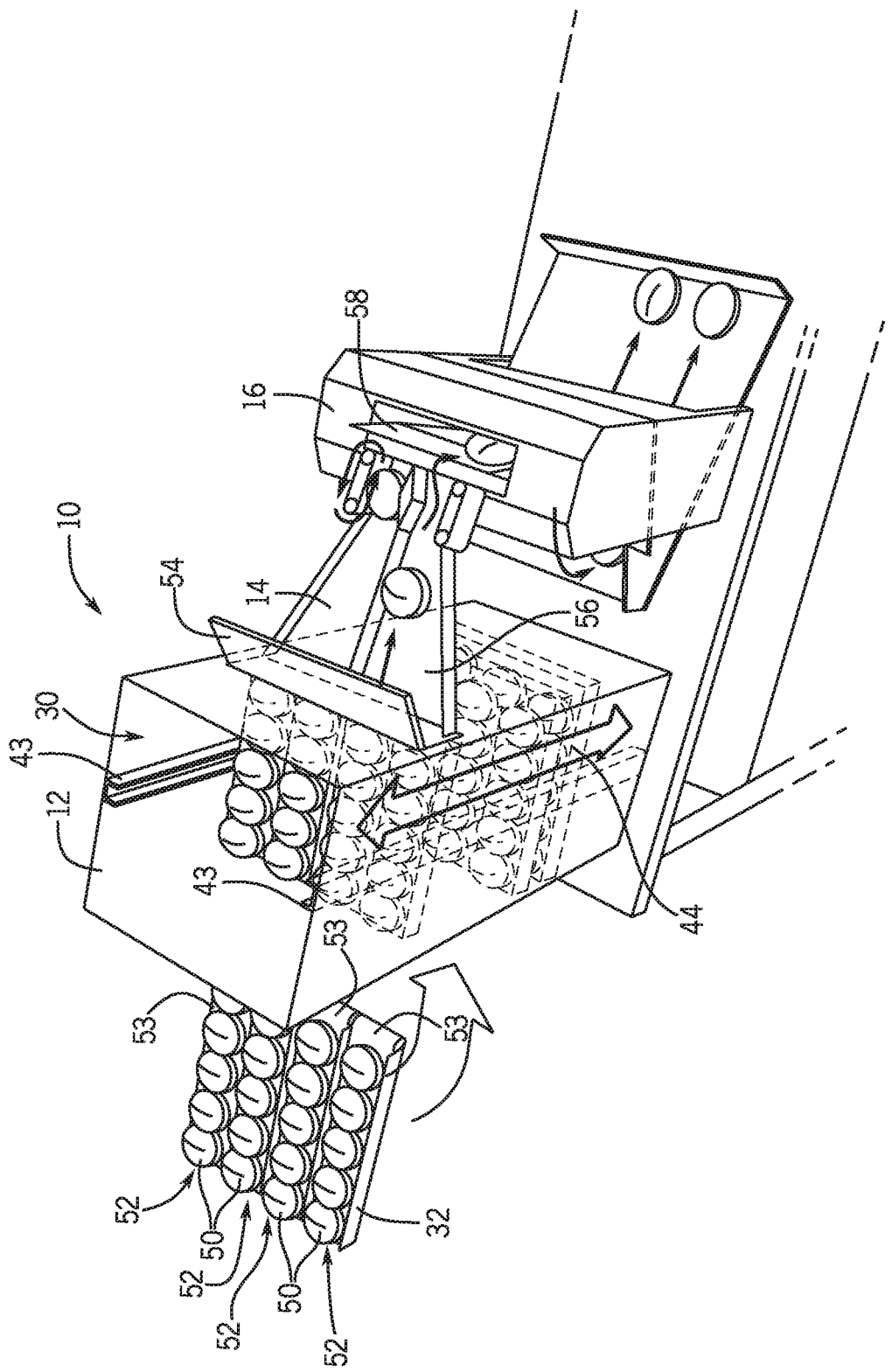
FIG. 3 depicts a further exemplary embodiment of a baked goods handling system.

FIG. 3 depicts another exemplary embodiment of a baked goods handling system 10 within the scope of the present disclosure. The holding cabinet 12 receives trays 32 of the baked goods (e.g. buns 50) for holding within a controlled environment and dispensing selected baked goods therefrom. In an exemplary embodiment, the trays 32, and/or portions of trays 32, and/or individual lanes 52 of trays 32 are movable within the holding cabinet 12 to provide for a selection of a variety of baked good types either all available at a dispensing position or movable to be arranged at the dispensing position. The holding cabinet 12 is operable with cabinet actuators 44, for example with a mechanical elevator, lift, or conveyor to position the trays 32 within the holding cabinet 12. The trays 32 are exemplarily movable in a vertical direction along rails 43. This may also provide for inventory management as some trays/tray portions and/or lanes may be dedicated to specialty or lower volume baked goods while other trays/tray portions and/or chutes may be dedicated to high volume baked goods. The high volume baked goods can thus be used and replenished more frequently while the holding cabinet maintains the quality of the specialty/lower volume baked goods awaiting use in an order. The trays 32 and/or individual lanes 52 of the trays 32 may include conveyors 53 which can operate to advance a single bun for dispense. In an exemplary embodiment, this may help to control dispense of buns and ensure that the selected bun is dispensed. In an exemplary and non-limiting embodiment, trays 32 filled with buns 50 are loaded into the bottom of the holding cabinet 12, where the holding cabinet creates and maintains the controlled environment. As more buns are needed/used, the holding cabinet 12 cycles trays 32 upwards to position a tray filled with buns in a dispensing position, for example relative to a gate 54 and/or a dispenser 14. Exit of the buns 50 from the holding cabinet 12 may be controlled by the gate 54. As will be described in further detail herein, the gate 54 may selectively operate relative to a single lane 52 or may open across a plurality of lanes 52. Once the buns 50 from that tray 32 are dispensed, the holding cabinet 12 moves the empty tray further up along the rails 43 within the holding cabinet 12 for storage and/or removal, while a new tray 32 filled with buns 50 is cycled into the dispensing position within the holding cabinet 12. In embodiments, the holding cabinet 12 may have a single door 34 for access to the compartment 30, or may include a lower door (not depicted) for loading trays filled with buns and an upper door (not depicted) for removing empty trays. It will also be recognized that this order of loading and unloading may also be reversed. A person of ordinary skill in the art will recognize variations from this disclosed embodiment that are within the scope of the present disclosure. The holding cabinet 20 is exemplarily configured to hold a plurality of trays 14 within the controlled environment of the holding cabinet 20.

The dispenser 14 exemplarily includes a ramp 56 that conveys by gravity feed to position a bun 50 relative to the toaster 16. However, it will be recognized that in other embodiments, a driven conveyor may move the bun 50 from the holding cabinet 12 to the toaster 16. It has been recognized by the inventors that even when baked goods have been pre-sliced (e.g pre-sliced buns or bread), that the environmental conditions that promote the preservation of baked good quality also can cause the slices (e.g crown and heel) to fuse or stick at the sliced interface. Therefore, additional mechanical separation in the dispense of baked goods is needed in embodiments to be able to properly direct bun portions or slices into the toaster 16 and/or to particular toasting paths of the toaster 16. The toaster 16 may include a separation plate 58 that divides the toasting paths and also extends above the toasting paths to present a physical obstruction against which the bun may strike to further separate the bun portions. The dispenser 14 drops the bun 50 down the ramp 56 towards the toaster 16 from a sufficient height such that when the bun 50 strikes the separation plate 58, the bun 50 separates into the two halves and each half is directed into a toasting path of the toaster 16.

Currently baked goods often are received from a bakery in bagged "pillow packs." The pillow packs are constructed and treated such as to create an environment suitable for holding and preserving quality of the baked goods therein. However, upon opening the pillow pack, the baked goods will quickly begin to degrade and become stale. Thus, in use, the pillow packs may be opened and the baked goods directly loaded onto a tray 32 and moved to the controlled environment of the holding cabinet 12. This limits the exposure of the baked goods to the ambient air and enables the holding cabinet 12 to promote baked good holding and quality. In exemplary embodiments, individual trays 32 may be sized and/or dimensioned such as to receive the entirety of a "pillow pack" of baked goods such that the tray 32 can accommodate all of the baked goods of the "pillow pack," once it is opened. This limits the likelihood that baked goods will be held outside of the controlled environment of the "pillow pack" or within the holding cabinet 12. In other embodiments, trays 32 or portions of trays 32 may be configured to accommodate a regular portion of a "pillow pack" of baked goods, for example half of a "pillow pack". In this manner, two trays can be filled with the contents of an opened "pillow pack."

Like reference numerals are used herein to denote similar components between embodiments while focusing the disclosure on features shown in this embodiment. A person of ordinary skill in the art will recognize from the present disclosure that components between the various embodiments may be combined and recombined with more or fewer components to arrive at still further embodiments within the scope of the present disclosure.

Figure 4A:
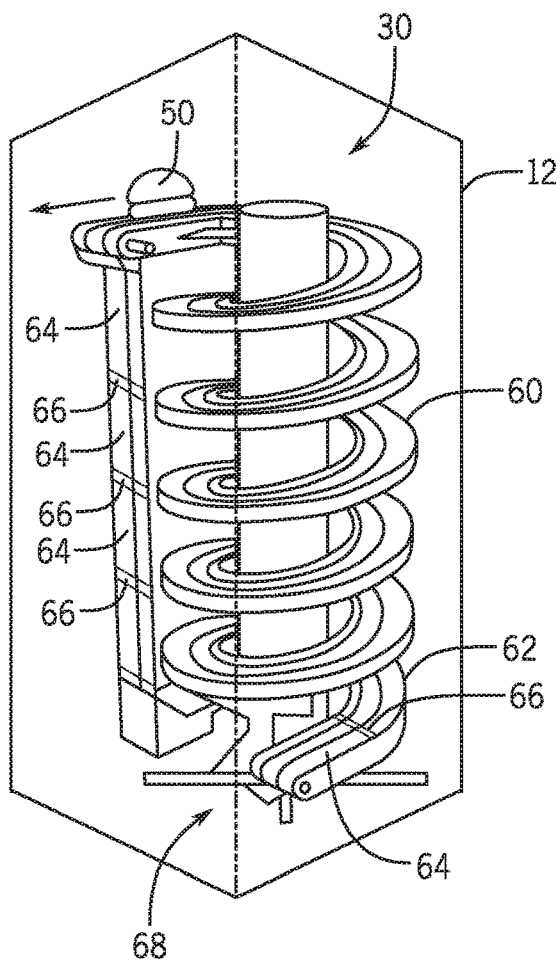
FIGS. 4A and 4B are exemplary embodiments of a vertical screw conveyor bun holding cabinets.
Figure 4B:
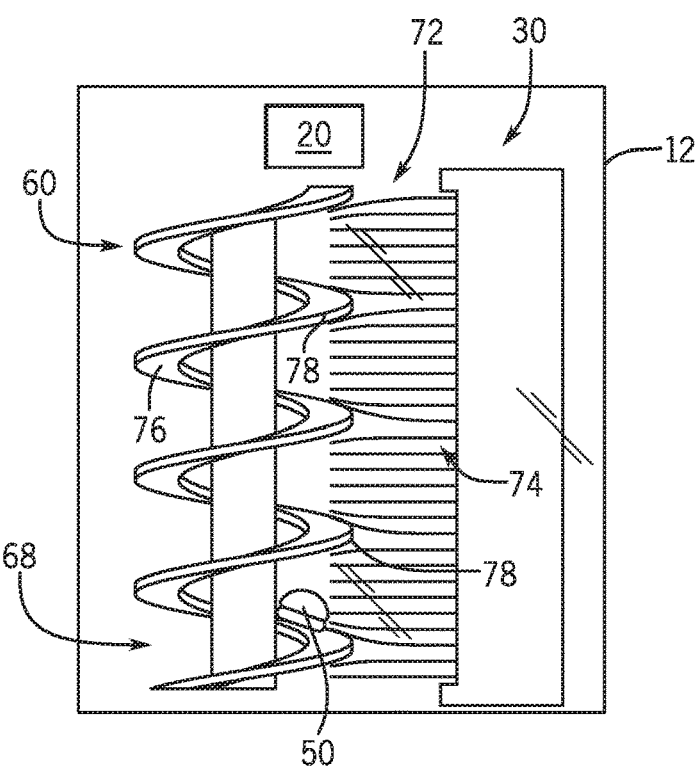

FIGS. 4A and 4B depict exemplary embodiments of the compartment 30 of a holding cabinet 12. The holding cabinet 12 includes a vertical auger 60 as the cabinet actuator configured to move the buns within the cabinet. In FIG. 4A, the vertical auger 60 is exemplarily helical in shape and progressively moves buns 50 vertically along a screw or spiral shaped path. While the embodiment of the vertical auger 60 depicted in FIG. 4A includes five and a half revolutions, it will be recognized that more or fewer may be used in embodiments within the scope of the present disclosure. The vertical auger 60 may include an auger conveyor 62 that comprises a plurality of sections 64 each exemplarily defined by a ridge 66. As the auger conveyor 62 moves along the screw or spiral shaped path, it carries a bun 50 with it within one of the sections 64 separated by ridges 66. In embodiments, the ridges 66 may help to contain a bun 50 within a respective section 64, and interconnection of the sections 64, for example at the ridges 66 may provide the needed degrees of freedom movement to follow the conveyor path of the vertical auger 60. The auger conveyor 62 takes up a bun 50 at the auger inlet 68 and each advance of the auger conveyor 62 brings the bun 50 closer to the auger outlet 70, where the bun 50 exits the holding cabinet 12 to the dispenser to deliver the bun to the toaster (not depicted). Exemplarily, the vertical auger 60 operates to elevate the bun 50 to a position above the treatment device, which may facilitate delivery by, or partially by, gravity feed. The advances of the auger conveyor 62 may be metered such that each advance is associated with taking up one bun at the auger inlet 68 and dispensing one bun out of the auger outlet 70. In this manner, the vertical auger 60 can be self-loading, provided that supplies of buns are available at the auger inlet 68. In embodiments, trays 32 (not depicted) of buns as described may be held within the compartment 30 relative to the auger inlet 68. In still further embodiments, the auger conveyor 62 may interact with or engage the tray 32 to withdraw buns from the tray 32.

FIG. 4B depicts an additional embodiment of a vertical auger 60. An engagement device 72 is arranged relative to the vertical auger 60 in a way such that the bun 50 presses against the engagement device 72 and the vertical auger 60 is rotated below the bun 50. The engagement device 72 holds the bun 50 in place laterally as the angled blade of the vertical auger 60 rotates below the bun 50 to raise the bun vertically. In exemplary embodiments, the engagement device 72 may be a brush with a plurality of pliable bristles 74. In another exemplary embodiment, the engagement device 72 may include a plurality of elastomeric fingers or flaps. The vertical auger 60 is structured with a solid auger blade 76. The auger blade 76 receives a bun 50 at the auger inlet 68 and moves the bun 50 into engagement with the bristles 74 of the engagement device 72. In an embodiment, as the auger blade 76 rotates, an edge 78 of the auger blade 76 is pushed through the bristles 74 of the engagement device 72. The bun 50 is elevated by further rotation of the auger blade 76 until the bun 50 reaches the auger outlet 70 from which the bun 50 is dispensed.

Figure 5A:
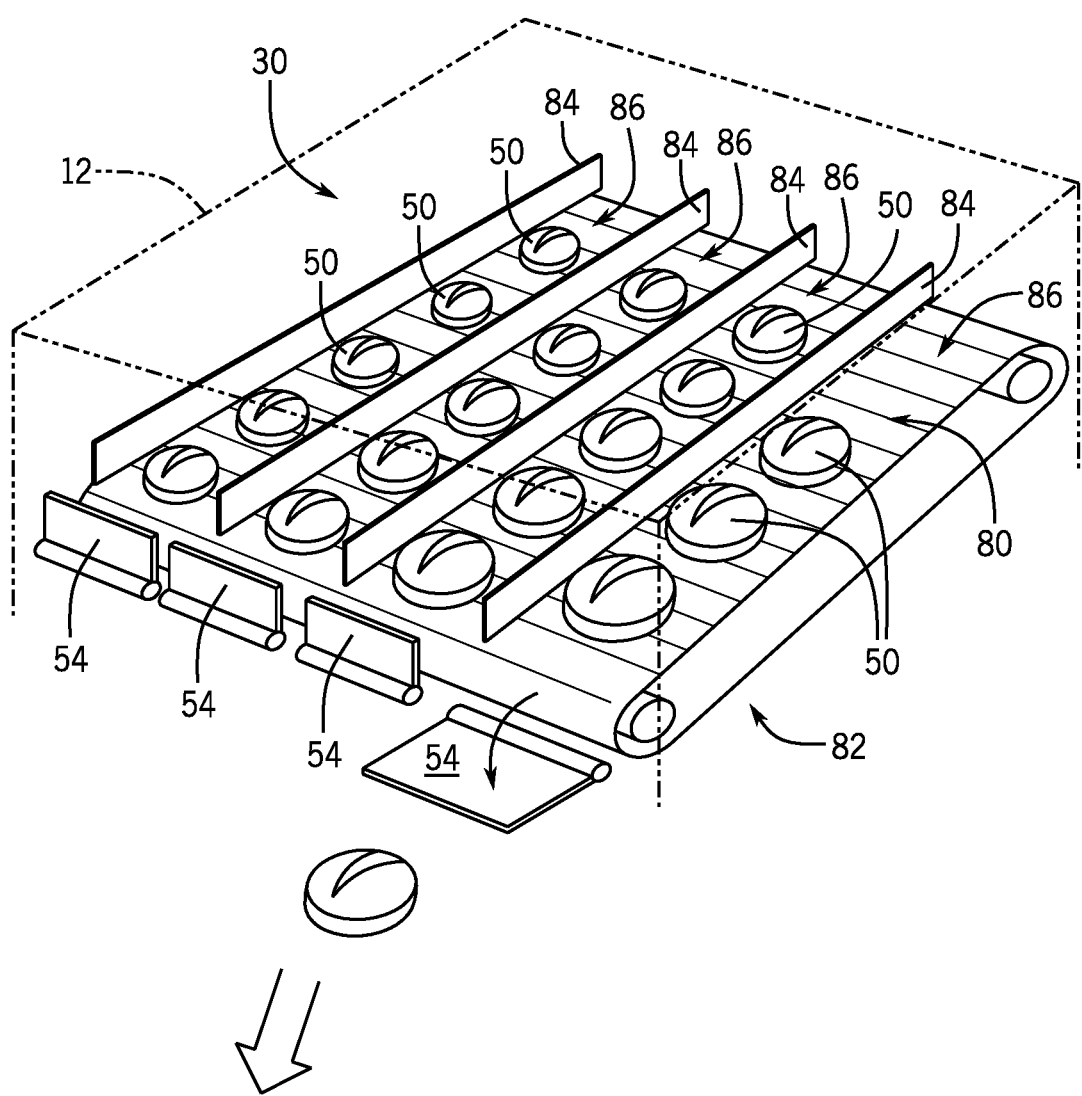
FIGS. 5A-C depict exemplary embodiments of conveyors for use in bun holding cabinets.
Figure 5B:
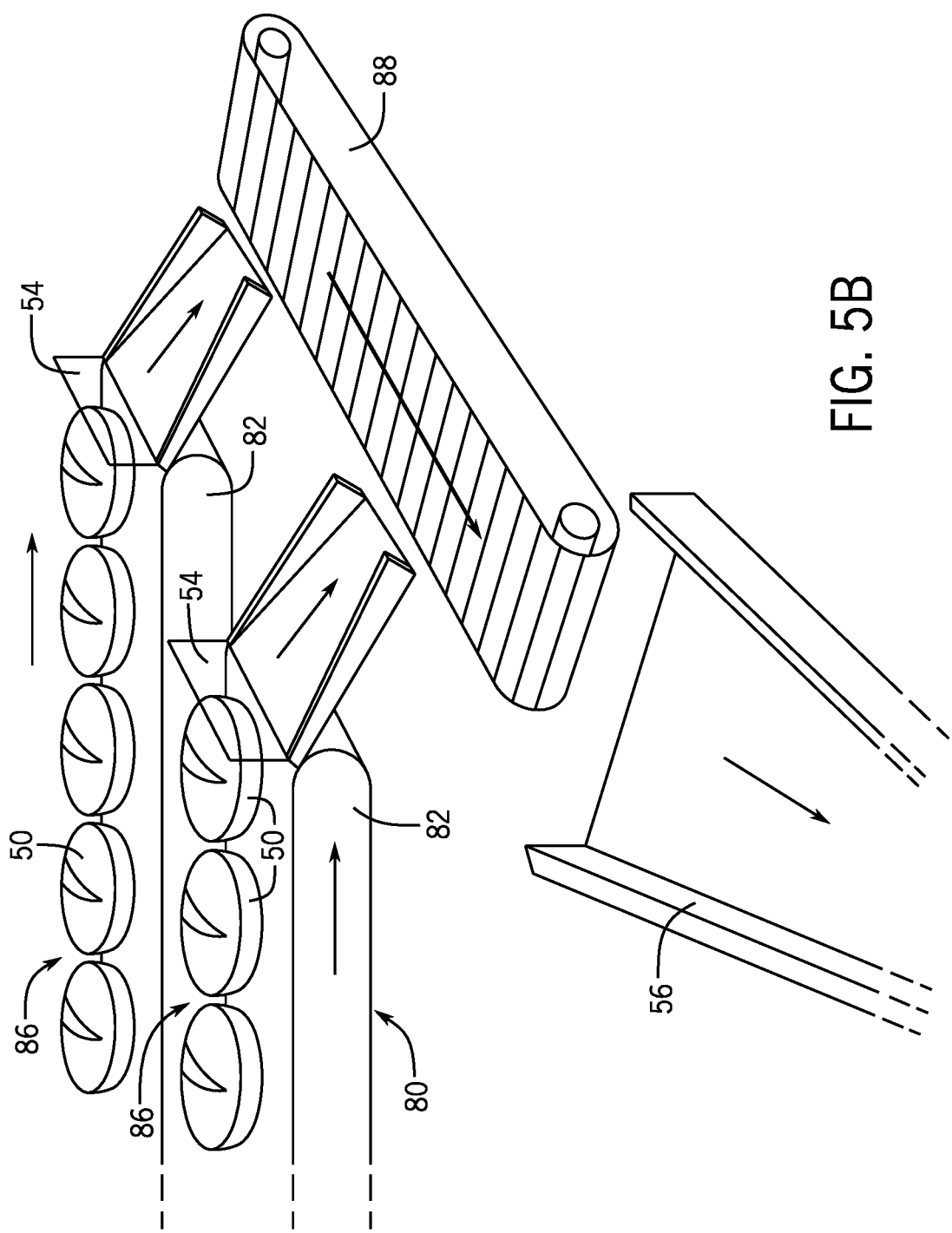
Figure 5C:
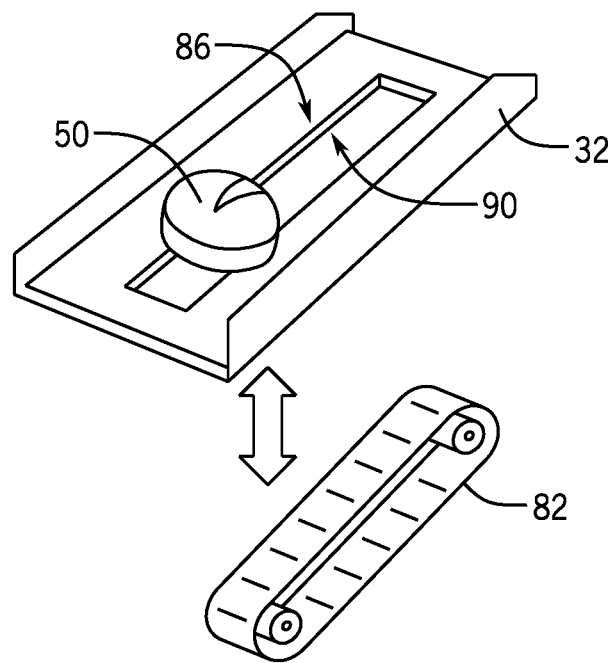

FIGS. 5A-5C depict another exemplary embodiment of an arrangement of a system of a cabinet actuator within the compartment 30 of a holding cabinet 12. As depicted in FIG. 5A, an exemplary embodiment of the holding cabinet 12 includes a conveyor assembly 80. In embodiments, the conveyor assembly 80 may be movable and removable within the compartment 30, for example as depicted in FIG. 3. The conveyor assembly 80 exemplarily includes a conveyor 82. In embodiments, the conveyor 82 may be a single conveyor, or may be a plurality of conveyors arranged side by side as a group, as depicted in FIG. 3. Dividers 84 provide a physical separation between individual lanes 86 for buns 12 to be held and dispensed from. Independently operable gates 54 can either be a part of the conveyor assembly 80, or may be fixed to the holding cabinet. The gates 54 are selectively opened and closed to dispense a bun 50 from a particular lane 86. In an exemplary embodiment, each lane 86 may be loaded with a different type of bun, or multiple lanes 86 may be loaded with the same type of bun 50. The operation of the gates 54 to open may be based upon a selected bun type, or a monitored inventory of buns 50 within the holding cabinet and/or within a particular lane 86.

In an exemplary embodiment, the conveyor 82 may be constructed of silicone, Teflon, a material that includes Teflon, or another material that has non-stick properties. The conveyor 58 may easily slide below the buns 50 when the conveyor 82 is moved forward and a respective gate 54 is closed. Only when the respective gate 54 is opened is the bun 50 in that lane 86 moved forward. In still further exemplary embodiments, the conveyors 82 may be vibratory instead of or in addition to having non-stick properties. Vibratory feed methods in the conveyor 82 may alternatively or in addition reduce the friction coefficient between the bun 50 and the conveyor 82 enabling the conveyor 82 to slide more easily underneath the bun 50 when the bun engages the gate 54, blocking the path of the bun.

As noted previously, in another exemplary embodiment, most notably as depicted in FIG. 3, the conveyor assembly 80 includes a plurality of independently operated conveyors, for example one conveyor for each lane 86. In such an embodiment, gates 54 may still be provided for each lane 86. The gates 54 may still be operated independently so as to only open the gate 54 associated with the lane 86 operating to dispense a bun 50. This can help to maintain the controlled environment within the compartment 30. In another embodiment, a single gate 54 may extend across the entire conveyor assembly 80 and open to permit a bun 50 to be dispensed by operating a single conveyor associated with a bun lane 86. As shown from FIGS. 3 and 5A, the gates 54 may open upwardly or downwardly. A person of ordinary skill in the art will recognize other types mechanisms may be used for the gate as well.

FIG. 5B depicts a variation of the embodiment described above, wherein the buns 50 are dispensed from the conveyor assembly 80, for example from tray 32 comprising the conveyor assembly 80 within the compartment 30 of the holding cabinet 12 to a dispensing conveyor 88. The dispensing conveyor 88 may be interior of the compartment, but as depicted, the dispensing conveyor 88 is located exterior of the compartment 30 and receives the bun 50 dispensed from the holding cabinet 12 and directs it to the subsequent processing device, for example a toaster (not depicted). As further depicted in FIG. 5B, separate conveyors 82 define each of the plurality of lanes 86 of buns 50 and each have an associated gate 54 to control the dispense of the bun 50. The conveyors 82 and the gates 54 are operated to dispense a bun 50 from a particular lane 86 to the dispensing conveyor 88 that in turn directs the bun 50 to a ramp 56 exemplarily into the toaster.

FIG. 5C depicts a still further example of a conveyor assembly 80. In the embodiment, the conveyor 82 is separable from the tray 32 that supports the bun 50. In embodiments, the tray 32 supports the bun 50 in the lane 86. The tray 32 can be loaded with buns and then moved into position in the compartment relative to the conveyor 82 which is exemplarily a part of the holding cabinet 12. The conveyor 82 can be disengaged from the bun 50 in the tray 32 when the buns in that lane 86 are not intended to be moved. This can be achieved by relative movement between the tray 32 that holds the bun 50 and the conveyor 82. The tray 32 may include an aperture 90 through which the conveyor 82 can selectively extend to engage the bun 50. The tray 32 may be raised and lowered relative to the conveyor 82. The conveyor 82 may be raised and lowered relative to the tray 32. The conveyor 82 partially extends through the aperture 90 to engage the bun 50 to move the bun 50 with the conveyor 82. When the conveyor 82 is not in contact with the bun 50, the bun 50 may rest on the tray 32, for example straddling the aperture 90.

It will be recognized that the embodiment depicted in FIG. 5C may be used with any of the embodiments as described in the present application. For example, the tray 32 of FIG. 5C may include multiple lanes separated by dividers. Within the compartment of the holding cabinet, the trays 32 may be moved by the cabinet actuators to raise, lower, or translate the trays 32 relative to conveyors 82 of a plurality of conveyors 82. When a tray 32 is in a dispensing position, a conveyor 82 is received through the aperture 72 to engage the buns. Once all of the buns have been advanced out of the tray 32, the tray can be moved away from the conveyor 82 into a position within the cabinet for reloading.

Figure 6:
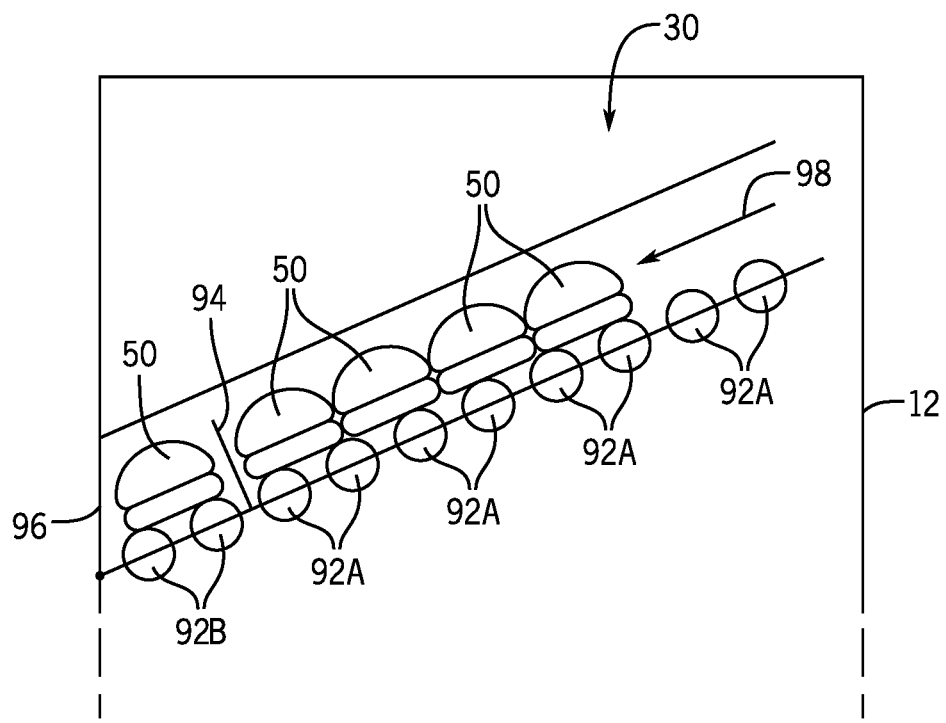
FIG. 6 is an exemplary embodiment of a roller arrangement in a bun holding cabinet.

FIG. 6 depicts a still further exemplary embodiment of a bun holding cabinet 12 in which the buns 50 are conveyed on a series of rollers 92. An interior gate 94 and an exterior gate 96 control the movement of the buns 50 within the cabinet 12 to dispense a bun 50 from the cabinet 12. The rollers 92 are also arranged in two groups, passive rollers 92A facilitate movement of the buns 50 in the direction of arrow 98 (e.g. towards interior gate 96) by a gravity feed. The interior gate 96 holds the buns 50 in position within the holding cabinet 30 against the gravity feed. The active rollers 92B are exemplarily driven by a motor (not depicted) to dispense the bun 50 held between the exterior gate 96 and the interior gate 94 once the exterior gate 96 is opened. After the bun 50 is dispensed through the open exterior gate 96, the exterior gate 96 is again closed. The interior gate 94 is then opened and a next bun is dispensed by a gravity feed through the open interior gate 94 into engagement with the exterior gate 96. The interior gate 94 is then closed again until the bun 50 is dispensed.

Figure 7:
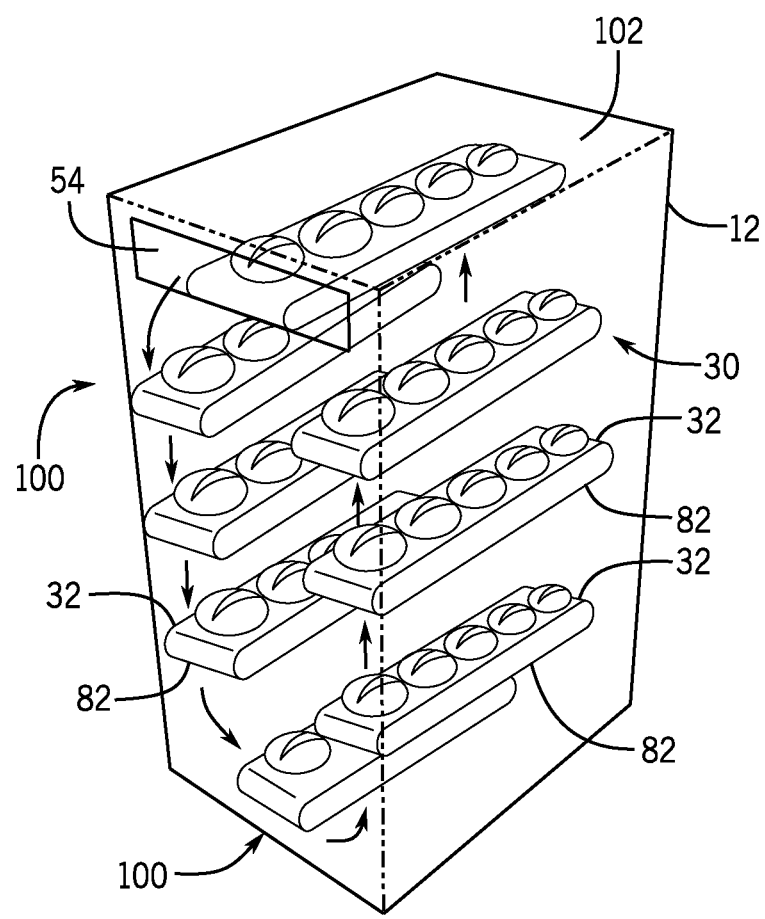
FIG. 7 is an exemplary embodiment of a carousel bun holding cabinet.

FIG. 7 depicts a still further exemplary embodiment of a bun holding cabinet 12. Within the bun holding cabinet 12, buns 50 are held on a series of trays 32 with conveyors 82 which are movable within the cabinet 12 in a carousel manner. The trays 32 may be any of the trays 32 and or conveyors 82 as described in the embodiments above, or may be another arrangement as will be recognized in view of the present disclosure. The separate trays 32 may be rotated between a loading position 100 (or loading positions) and a dispensing position 102. In an exemplary embodiment, at the dispensing position 102 a door or gate 54 blocks the dispense of the bun 50 until a signal is received for bun dispense from the bun holding cabinet 12. Upon opening of the door or gate 54, the conveyor 82 is activated to dispense the requested bun 12. A number of buns dispensed from the conveyor 82 may be counted and/or otherwise tracked and when the tray 32 is empty the carousel rotates to move the next tray 32 loaded with buns 50 into the dispensing position 102.

As described above, exemplary processes for handling baked goods include a number of actions performed by and with components of the baked goods handling system 10, including, but not limited to the bun holding cabinet 12. These actions may be performed by individual initiation at each of the components, for example, upon user inputs or actuations at each of the components as described herein, or may be performed automatedly based upon instructions provided by the KMS through the IOT system as described above. In still further embodiments, the components of the baked goods handling system may communicate directly with one another for example by wired or wireless communication. In a still further embodiment, the baked goods handling system 10 may be integrated into a single apparatus that provides holding, dispensing and toasting functions.

Citations to a number of references are made herein. The cited references are incorporated by reference herein in their entireties. In the event that there is an inconsistency between a definition of a term in the specification as compared to a definition of the term in a cited reference, the term should be interpreted based on the definition in the specification.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A baked good holding cabinet, comprising:
a compartment defined by compartment walls and the compartment is configured to create a controlled environment within the compartment;
a tray within the compartment, the tray comprising at least one conveyor wherein the at least one conveyor is at least one conveyor belt wherein the tray is removable from the compartment and configured to receive a plurality of baked goods directly on the at least one conveyor of the tray before loading the tray into the compartment to hold the plurality of baked goods in the controlled environment; and
wherein the at least one conveyor of the tray is operable to move a baked good of the plurality of baked goods on the at least one conveyor through a dispense point of the cabinet.

2. The baked good holding cabinet of claim 1, wherein each tray defines a plurality of lanes across the at least one conveyor and each lane is configured to simultaneously hold the plurality of baked goods.

3. The baked good holding cabinet of claim 2, wherein the at least one conveyor is operated to selectively advance a single baked good of the plurality of baked goods on the tray through the dispense point of the compartment.

4. The baked good holding cabinet of claim 3, further comprising at least one gate arranged relative to the plurality of lanes, the at least one gate defining the dispense point, wherein when the at least one gate is open, the at least one conveyor operates to move a baked good through the dispense point past the open gate.

5. The baked good holding cabinet of claim 3, wherein the at least one conveyor of the tray comprises a plurality of conveyors with a conveyor of the plurality associated to each lane of the plurality of lanes.

6. The baked good holding cabinet of claim 3, wherein the at least one conveyor is a single conveyor and a plurality of dividing walls extend over the single conveyor to define the lanes across the single conveyor.

7. The baked good holding cabinet of claim 6, further comprising a plurality of gates, each gate of the plurality of gates arranged relative to one of the lanes of the tray at the dispense point.

8. The baked good holding cabinet of claim 7, wherein one gate of the plurality of gates selectively opens through a compartment wall at the dispense point while the single conveyor advances to dispense a baked good of the plurality of baked goods in a lane past the one gate and out of the compartment, and a rest of the plurality of gates remain closed to maintain the controlled environment, blocking advancement of the plurality of baked goods in remaining lanes across the single conveyor and the single conveyor slides below the plurality of baked goods in the remaining lanes.

9. The baked good holding cabinet of claim 1, further comprising a cabinet actuator that engages the tray and moves the tray with the baked goods within the compartment and into alignment with the dispense point.

10. The baked good holding cabinet of claim 1, further comprising a processor, the processor receives an instruction to dispense a baked good and operates the at least one conveyor to move a baked good through the dispense point of the cabinet.

11. The baked good holding cabinet of claim 10, further comprising an environmental control device operable by the processor to maintain at least one predetermined environmental condition within the compartment.

12. The baked good holding cabinet of claim 11, wherein the predetermined environmental condition is at least one of temperature, humidity, and atmosphere composition and further comprising at least one gate defining the dispense point of the cabinet, wherein the at least one gate is selectively operable to maintain the environmental condition of the controlled environment within the compartment.

13. The baked good holding cabinet of claim 10, wherein the processor is communicatively connected to a kitchen management system (KMS) and receives instructions to dispense a baked good from the KMS.

14. The baked good holding cabinet of claim 13, wherein a plurality of different types of baked goods are held within the compartment and the instructions from the KMS identify a type of baked good to dispense from a plurality of baked goods held within the compartment and selectively operates the at least one conveyor.

15. The baked good holding cabinet of claim 14, wherein each tray comprises a type of baked goods and the processor operates the cabinet actuator to advance a tray of the selected type of baked good to a position relative to the dispense point.

* * * * *